United States Patent Office 3,199,481
Patented Aug. 10, 1965

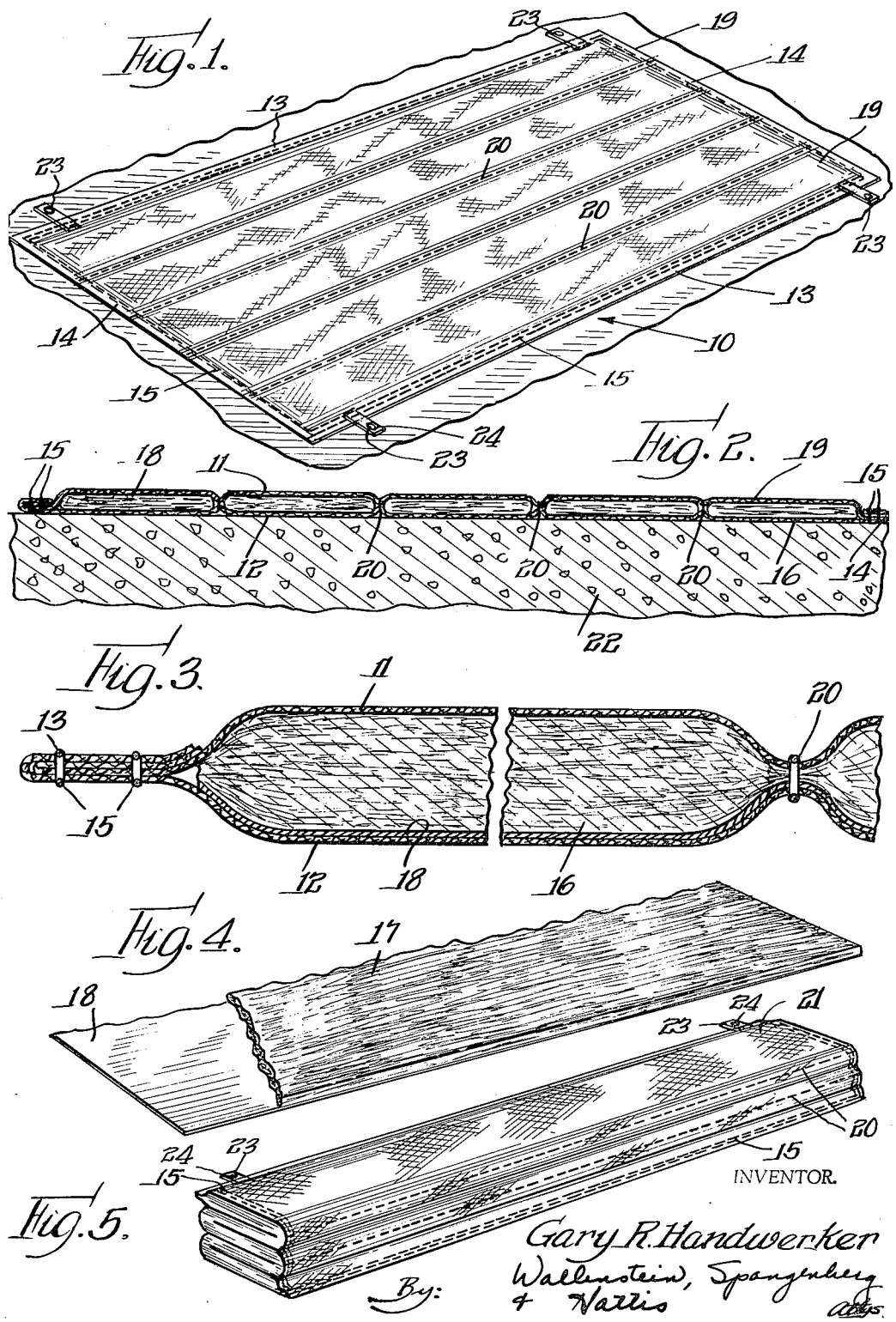

3,199,481
INSULATING ARTICLE
Gary R. Handwerker, Skokie, Ill., assignor to Midwest Canvas Corporation, Chicago, Ill., a corporation of Illinois
Filed Dec. 18, 1961, Ser. No. 159,841
1 Claim. (Cl. 112—420)

This invention relates to an insulating article for application on the surface of substantially freshly poured concrete to retard dissipation of the heat liberated during the setting and hardening of the concrete, and to a method of conserving such heat to accelerate strength development in the concrete.

In concrete construction, the essential bonding agent in concrete is a member of a class of hydraulic cements generically referred to as Portland cement. In the usual case, such an agent is admixed with rock, sand and water to produce Portland cement concrete. The reactions by virtue of which Portland cement becomes a bonding agent in the fabrication of concrete take place in a water-cement paste. Upon addition of water, the silicates and aluminates in the cement interact to form hydration products which, in a given period of time and under proper conditions, produce a firm, hard mass. During this maturing process considerable heat is liberated.

The setting and hardening of concrete, coupled with the development of optimum strength characteristics therein, have been found to be closely associated with the temperature changes that occur in the water-cement paste. Under normal conditions, conservation of the heat generated by the reactions of hydration and crystallization in the paste is not important. However, under adverse weather conditions, too rapid dissipation of the heat liberated may result, markedly delaying setting and hardening of the concrete and deleteriously affecting the development of proper strength characteristics therein. At such times, therefore, it is necessary to take steps to conserve the heat evolved during the maturation period.

Heretofore, it has been the common practice to simply spread a vegetable material such as straw over the surface of freshly laid concrete. While reasonably satisfactory results are obtained with this material, there are important disadvantages connected with its use. Straw is a bulky material, a characteristic which makes it difficult to handle and transport. Moreover, it always constitutes a fire hazard. In addition, straw requires substantial manipulation by relatively high cost building-trades labor to spread it over a concrete surface. Apart from these significant economic shortcomings, the use of straw as a protective expedient for concrete has certain functional disadvantages. Since this material is generally strewn on concrete by hand, there is, in many instances, lack of uniformity in the depth of the straw layer. This condition, coupled with the inherent porous character of the stereoreticulate mass, tends to admit cold air and moisture thereby increasing the possibility of damage to the maturing concrete. Furthermore, straw is light in weight, and, unless protected in some manner, is susceptible to being blown away by the wind. In this same regard, straw, due to its light weight, can be utilized only on horizontal, or moderately inclined surfaces, and, moreover, affords little protection against falling objects.

It is an object of this invention to provide improved means for protecting concrete from adverse weather conditions and other damaging agents during the maturation period.

It is also an object of this invention to provide improved means for protecting concrete from adverse weather conditions and other damaging agents during the maturation period which means can be easily transported and manipulated, which requires substantially less time to apply to a concrete surface than conventional protective materials, and which means provides substantially uniform heat insulation for the concrete.

It is another object of this invention to provide improved means for protecting concrete from adverse weather conditions and other damaging agents during the maturation period which can be used with substantially equal facility on horizontal, inclined, and vertical surfaces.

It is yet another object of this invention to provide improved means for protecting concrete from adverse weather conditions and other damaging agents during the maturation period which is durable, weather resistant, and relatively inexpensive.

It is also an object of this invention to provide an improved method for protecting concrete from adverse weather conditions and other damaging agents during the maturation period.

Other objects and advantages of this invention will become apparent as the description proceeds.

Briefly, the insulating article of this invention in its preferred aspects comprises a multi-ply, multiple compartmented body desirably fabricated of a closely woven, heavy fabric which has been treated to impart moisture-repellent properties thereto. The edges of the plies of fabric are suitably secured to one another in a manner to resist the passage of moisture therebetween. The compartments of the body are advantageously filled with a light-weight substance having low thermal conductivity. The dimensions of the articles may vary considerably. In its preferred embodiments it desirably is of sufficient length and width to cover a substantial area of a concrete surface and yet permit easy manipulation by a single workman. Means are provided on the article for retaining it in a desired position on a steeply inclined or vertical surface.

In order that the invention may be fully understood, reference will now be made to the drawings wherein an exemplary embodiment of the article is illustrated, it being understood, however, that variations both in construction and in material may be made without departing from the scope of the invention except as defined by the appended claim.

In the drawing,

FIG. 1 is a view in perspective of an embodiment of the insulating article;

FIG. 2 is a transverse vertical sectional view of the insulating article illustrated in FIG. 1;

FIG. 3 is an enlarged fragmentary view in section showing details of the article;

FIG. 4 is a view in perspective of a sheet of insulating material having utility in the article;

FIG. 5 is a view in perspective of the insulating article in a folded, compacted state.

Referring now in particular to FIGS. 1, 2 and 3, a preferred embodiment of the insulating article of this invention is illustrated and is generally designated at 10. The article 10 desirably comprises two opposed sheets or plies 11 and 12 of a heavy, closely woven fabric such as, for example, canvas. The fabric may be advantageously treated to impart moisture-repellent properties to it. This serves to protect against vapor infiltration and materially enhances the insulative characteristics of the article. If desired, the fabric may be additionally processed to render it substantially fireproof to prevent damage thereto from carelessly discarded cigarettes, accidentally upset fuel-burning warning signals, or the like.

The edges 13—13 and 14—14 of the fabric plies 11 and 12 are advantageously secured together in a manner to resist passage of moisture therebetween. This may be conveniently accomplished in a variety of ways, one particularly suitable method being to double the edges over, as clearly illustrated in FIG. 3, and retaining them in that position as by stitching 15.

Disposed between the sheets or plies 11 and 12 and occupying a position intermediate the secured edges 13—13 and 14—14, is a substance 16 desirably having low thermal conductivity. The term "low thermal conductivity" as employed herein refers to the capability of the substance 16 to resist the passage of heat through a unit cross section thereof. Since heat is always conducted from the warmer toward the colder body it is desirable in achieving the objectives of this invention that the quantity of heat conducted by the substance 16 be as low as is practicable. The substance 16 may be any of numerous thermal insulative materials, and may take the form of sheets, batts, or blankets, or may be particulate or granulated. Preferably the substance 16 should be light in weight, relatively fireproof, and have no abrasive edges to damage the fabric in which it is encased. There is a number of such materials which may be utilized to advantage in the article 10 of this invention, examples of which are mineral wool, expanded vermiculite, hair felt, or wool felt, felted asbestos, foamed plastics, cattle and hog hair, and the like. A particularly suitable material and one which is readily adaptable for use in the article 10 is spun glass. This material is available commercially in sheets or batts 17, as shown in FIG. 4, which may be easily cut to any desired size, and has the added advantage of being provided with a moisture retarding, thermally insulative backing 18. The desired lightweight character of the substance 16 not only facilitates the handling thereof but enhances its insulative properties. By having a low density, the substance 16 offers very little cross section for conduction and serves to break up convection currents in any enclosed air.

The thickness of the article 10 need only be sufficient to provide adequate insulation for the concrete surface over which it is laid. Generally, therefore, the article 10 will have a third dimension, namely, an appreciable thickness, generally ranging anywhere from ½ inch to 3 inches, more or less.

In the especially important aspects of the invention, and as illustrated in the drawing, the sheets or plies 11 and 12 are subdivided or compartmentalized, each subdivision or compartment 19 containing insulating substance 16. The compartments 19 may be defined or formed in any suitable manner as by stitching 20, and may be formed along the length of the article 10, as shown, or the width, or both, or may have a quilted form. This compartmented arrangement of the article 10 serves not only to maintain the substantially uniform thickness of the article by preventing the substance 16 from moving about to any appreciable extent or migrating within the sheets or plies 11 and 12, but serves also to preserve the insulative properties of each of the compartments 19 in the event that damage, as by tearing, is experienced by adjacent compartments. An added advantage to this construction resides in the desirable effect it has on the storability and maneuverability of the article. The stitching 20 provides a convenient folding line, permitting the article to be compacted into a relatively narrow bundle 21, as illustrated in FIG. 5. In this form the article takes up minimum space during storage and can be handled with greater facility by workmen when needed for application on a concrete surface 22.

The article 10 further may be advantageously provided with means such as tabs 23 having grommets 24 therein for attaching two or more insulating articles together in the event protection is required for an extensive surface area. Hooks, eyelets, or other suitable equivalents may be employed in place of the tabs 23 to achieve a like result. The utilization of means such as tabs 23 and grommets 24 in the article 10 has the added advantage of enabling the article to be suspended, by any means known in the art, in a manner to permit the article to protectively insulate a canted or substantially vertical surface from the elements. Thus, large areas of such construction can be protected with the article of this invention by attaching two or more articles together as hereinabove described. The tabs 23, in addition, enable the article to be hung on a wall when not in use.

In utilizing the article 10, it is only necessary to spread it on the surface of substantially freshly poured or maturing concrete. The weight of the article is sufficient to obviate the need for anchoring means of any kind. Cold, rain, snow, or other forms of precipitation, in addition to falling or thrown objects, are effectively barred from making contact with the concrete until sufficient time has elapsed to permit it to develop the desired strength characteristics and form a hardened mass. The article can be used for prolonged periods, and on numerous projects, without the need for cleaning or other maintenance. If for some reason a tear should develop in one of the plies or seams, it can readily be repaired by patching or stitching.

What I claim as new and desire to protect by Letters Patent of the United States is:

An insulating article for application on the surface of substantially freshly poured concrete to retard dissipation of the heat liberated during the setting and hardening of the concrete comprising two plies of moisture-repellent canvas of substantially equal dimensions, the edges of the plies being stitched together in a manner to resist passage of moisture between the plies, a layer of lightweight thermal insulative fiber-like material of substantially uniform density and thickness encased within the canvas plies, said plies with said layer of insulative material therein being longitudinally stitched together at spaced substantially parallel intervals between the stitched longitudinal edges of the plies to form a plurality of compartments of substantially uniform dimensions each containing a portion of said layer of insulative material and to prevent movement of the layer of insulative material within the plies, the compartments being spaced apart a distance sufficient to enable the article to be folded upon itself along the stitches forming the compartments whereby the compartments can be positioned in stacked relation with respect to one another to place the article in a compact easy to store and handle form and to enable the article to be readily unfolded onto a concrete surface to conserve heat liberated during the setting and hardening of the concrete, and tab means on said article enabling the article to be attached to others of said article in an unfolded condition to provide heat insulation to substantially freshly poured concrete surfaces having dimensions greater than said article, said tab means also enabling said article to be supported in a position other than horizontal.

References Cited by the Examiner

UNITED STATES PATENTS

| | | | |
|---|---|---|---|
| 1,306,518 | 6/19 | Briones | 112—420 |
| 1,331,562 | 2/20 | Foster | 112—420 |
| 1,371,755 | 3/21 | Gilcrest | 154—44.15 |
| 1,569,955 | 1/26 | Falter | 161—50 |
| 1,963,177 | 6/34 | Smallish | 161—52 |
| 2,137,756 | 11/38 | Gould et al. | 154—44.1 |
| 2,495,636 | 1/50 | Hoeltzel et al. | 154—44.15 |
| 2,593,373 | 4/52 | Weber | 154—44.1 |
| 2,844,501 | 7/58 | Snitker | 154—44.1 |
| 2,927,626 | 3/60 | Corwin et al. | 156—294 X |
| 3,020,183 | 2/62 | Calvaresi | 154—44.15 |

ALEXANDER WYMAN, *Primary Examiner.*

HAROLD ANSHER, *Examiner.*